(12) United States Patent
Caughey et al.

(10) Patent No.: US 8,973,194 B1
(45) Date of Patent: Mar. 10, 2015

(54) FOOD SKEWER TOOL

(71) Applicant: Edison Nation, LLC, Charlotte, NC (US)

(72) Inventors: Matt Caughey, Addison, IL (US); Scott Gary Dromms, Waxhaw, NC (US); Geoffrey R. Koch, Fort Mill, SC (US); Hongyuan Han, New Vernon, NJ (US); Jeffrey G. Ahearn, Warwick, NY (US); David A. Katzen, Basking Ridge, NJ (US); Alan A. Krushinskie, Green Brook, NJ (US)

(73) Assignee: Edison Nation, LLC, Charlotte, NC (US)

( * ) Notice: Subject to any disclaimer, the term of this patent is extended or adjusted under 35 U.S.C. 154(b) by 0 days.

(21) Appl. No.: 14/485,773

(22) Filed: Sep. 14, 2014

Related U.S. Application Data

(60) Provisional application No. 61/878,856, filed on Sep. 17, 2013, provisional application No. 61/879,247, filed on Sep. 18, 2013.

(51) Int. Cl.
*B25F 1/00* (2006.01)
*A47J 43/28* (2006.01)

(52) U.S. Cl.
CPC ............... *A47J 43/28* (2013.01); *A47J 43/288* (2013.01); *A47J 43/283* (2013.01)
USPC ......... 7/110; 294/7; 294/9; 99/419; 99/421 A

(58) Field of Classification Search
CPC ... A47J 37/0694; A47J 37/0623; A47J 43/18; A47J 43/283; A47J 43/288; A47L 13/08; A47L 13/02; B08B 1/00; A47G 21/045
USPC .................... 7/110, 112, 113, 151; 15/236.01–236.09; 294/9, 7, 24, 19.1, 294/26; 99/419, 421 A; 30/136–137, 142, 30/147–150, 164.9, 167, 314, 322, 325
See application file for complete search history.

(56) References Cited

U.S. PATENT DOCUMENTS

| | | | |
|---|---|---|---|
| D45,189 S * | 2/1914 | Ford | D7/644 |
| 2,485,521 A * | 10/1949 | Wendt | 294/7 |
| 5,813,120 A | 9/1998 | Stroh | |
| D427,858 S * | 7/2000 | Zemel | D7/692 |
| 8,495,952 B2 | 7/2013 | Solakian | |
| 2005/0060810 A1* | 3/2005 | McKelvie | 7/110 |
| 2011/0011279 A1 | 1/2011 | Solakian | |
| 2011/0187137 A1* | 8/2011 | Wales | 294/7 |

OTHER PUBLICATIONS

"SkewerMate" (http://skewermate.com/), accessed on Oct. 11, 2013 (1 page).
"Sliders" (http://www.quirky.com/products/139), accessed on Oct. 11, 2013 (5 pages).
"Vacu Vin Quick Skewer" (http://www.vacuvin.com/1536/Quick_Skewer.html), accessed on Oct. 11, 2013 (2 pages).

* cited by examiner

*Primary Examiner* — Lee D Wilson
*Assistant Examiner* — Melanie Alexander
(74) *Attorney, Agent, or Firm* — Tillman Wright, PLLC; James D. Wright; David R. Higgins

(57) ABSTRACT

A food skewer tool for removal of a food article from a skewer includes a flat elongated main body having a head portion disposed at a first end and a handle portion disposed at a second end opposite of the first end. The head portion and the handle portion are generally co-planar with one another. The tool further includes a notch extending inward into the head portion of the main body. The tool optionally includes a grip covering at least part of the handle portion of the main body. The tool further optionally includes an accessory disposed at the second end.

6 Claims, 6 Drawing Sheets

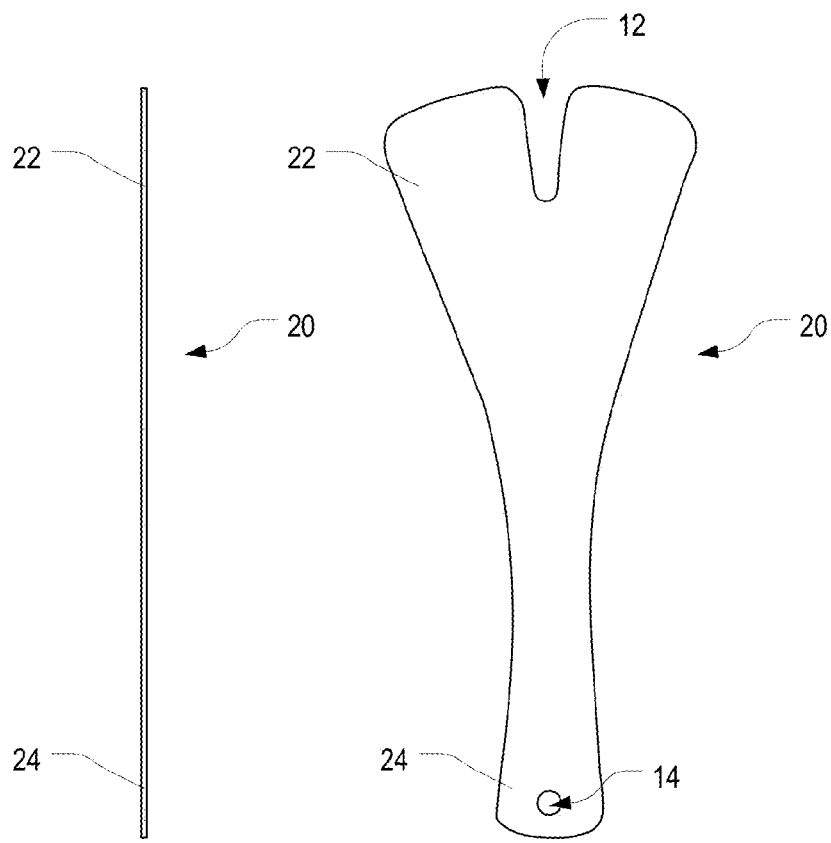
*FIG. 1A*  *FIG. 1B*

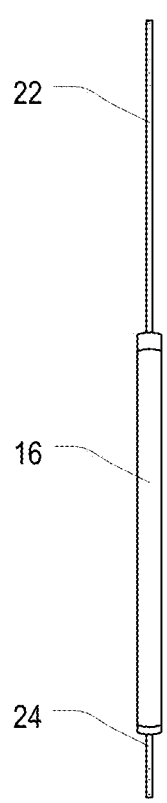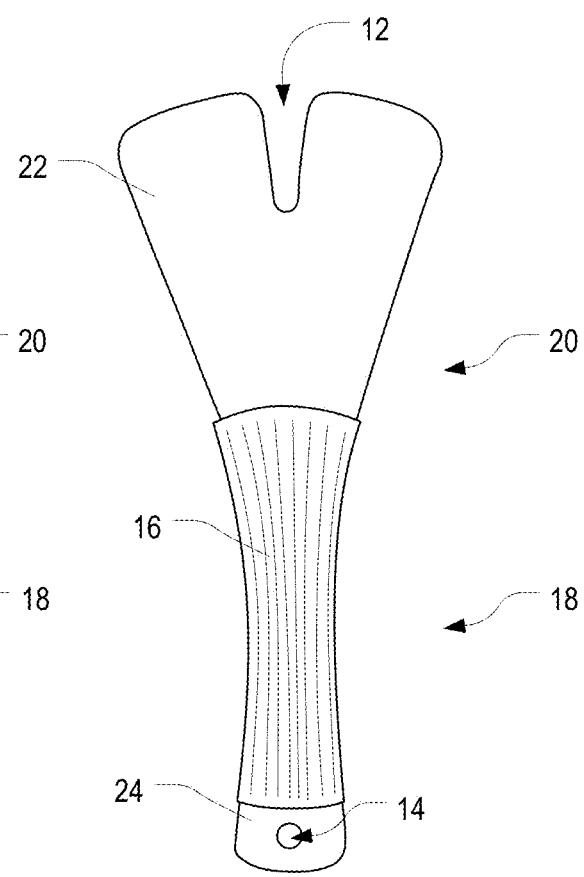
*FIG. 2A*    *FIG. 2B*

FOOD SKEWER TOOL

CROSS REFERENCE TO RELATED APPLICATIONS

The present application is a U.S. non-provisional patent application of, and claims priority under 35 U.S.C. §119(e) to, each of the following U.S. provisional patent applications:
  (a) U.S. provisional patent application Ser. No. 61/878,856, filed Sep. 17, 2013; and
  (b) U.S. provisional patent application Ser. No. 61/879,247, filed Sep. 18, 2013.
Each of the foregoing provisional patent applications is expressly incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

The present invention relates generally to accessories for use with food skewers, and, in particular, to accessories for removing or adding food to a skewer as part of a cooking process.

2. Background

When cooking food on a grill and the like, skewers are commonly used to hold smaller pieces of food in place, to make it easier to move and rotate the food, and to place the food on the grill and to remove it therefrom. As is well known, each skewer is inserted through multiple pieces of food, one after another. Foods that are commonly grilled include pieces of meat, including steak, chicken, seafood, and the like, and fruits and vegetables, including pieces of pepper, onion, tomato, and the like.

One problem with the use of skewers, however, is that it can be difficult to load and unload the food onto and off of the skewers. The cook or diner frequently uses his or her fingers, but this can be unsanitary and messy, and the food and skewers are hot when removed from the grill. Common implements, such as knives or forks, are sometimes used but are clumsy and inefficient. Special purpose skewer accessories have also been proposed, but are generally overcomplicated, expensive to manufacture, fail to solve the problem, and suffer from other problems.

One food removal tool is disclosed in U.S. Pat. No. 8,495,952 to Solakian. However, the angled body portion is expensive to manufacture, and the handle is bulky. Such a tool would also be too expensive to appeal to cooks and hosts who would like to be able to supply each diner with his or her own food skewer tool.

Thus, a need exists for a simple food skewer tool for loading and removing food from a skewer.

SUMMARY OF THE PRESENT INVENTION

Broadly defined, the present invention according to one aspect is a food skewer tool as shown and described.

Broadly defined, the present invention according to another aspect is a food skewer set as shown and described.

Broadly defined, the present invention according to another aspect is a food skewer set including a food skewer as shown and described and a skewer.

Broadly defined, the present invention according to one aspect is a food skewer tool, including: a flat main body; and a notch extending inward from an end of the flat main body.

In a feature of this aspect, the flat main body includes a head portion and a handle portion. In further features, the food skewer tool further includes a grip covering at least part of the handle portion of the flat main body; the head portion and the handle portion are co-planar with each other; and/or the notch is located in the head portion of the flat main body.

In another feature of this aspect, the notch narrows to a width of between ⅛ inch and ½ inch. In a further feature, the notch narrows to a width of approximately ¼ inch.

In another feature of this aspect, a mouth of the notch has a width of between ¼ inch and ¾ inch. In a further feature, the mouth of the notch has a width of approximately ½ inch.

In another feature of this aspect, the flat main body is constructed of stainless steel.

In another feature of this aspect, the food skewer tool further includes an accessory disposed at an end of the flat main body that is opposite from the end from which the notch extends inward. In a further feature, the notch includes a hook-shaped notch at its innermost point. In still another feature, the hook-shaped notch extends at a right angle from the remainder of the notch.

Broadly defined, the present invention according to another aspect is a food skewer tool, including: a main body; and a notch extending inward from an end of the main body and having a hook-shape portion at its innermost point.

Broadly defined, the present invention according to another aspect is a food skewer tool, including: a handle portion, having a first end and a second end, the second end opposed to the first end; a head portion, including a notch extending inward, at the first end of the handle portion; and an accessory at the second end of the handle portion.

In a feature of this aspect, the accessory is a bottle opener.

Broadly defined, the present invention according to another aspect is a food skewer set, including: a food skewer tool, including a head portion, having a notch therein, and a handle portion; and a plurality of skewers.

Broadly defined, the present invention according to another aspect is a food skewer set, including: a plurality of food skewer accessories, each including a head portion, having a notch therein, and a handle portion.

In a feature of this aspect, the food skewer set further includes a plurality of skewers.

Broadly defined, the present invention according to another aspect is a food skewer tool for removal of a food article from a skewer. The tool includes a flat elongated main body that has a head portion disposed at a first end and a handle portion disposed at a second end opposite of the first end. The head portion and handle portion are generally co-planar with one another. The tool further includes a notch extending inward into the head portion of the main body.

In a feature of this aspect, the food skewer tool further includes a grip covering at least part of the handle portion of the main body.

In another feature of this aspect, the notch narrows to a width of between ⅛ inch and ½ inch. In a further feature, the notch narrows to a width of approximately ¼ inch.

In another feature of this aspect, a mouth of the notch has a width of between ¼ inch and ¾ inch. In a further feature, the mouth of the notch has a width of approximately ½ inch.

In another feature of this aspect, the main body is constructed of stainless steel.

In another feature of this aspect, the food skewer further includes an accessory disposed at the second end. In a further feature, the accessory is a bottle opener.

In another feature of this aspect, the notch includes a hook-shaped notch at its innermost point. In a further feature, the hook-shaped notch extends at a right angle from the remainder of the notch.

Broadly defined, the present invention according to another aspect is a food skewer tool for removal of a food article from a skewer. The tool includes a main body that has a head portion disposed at a first end and a handle portion disposed at a second end. The head portion and handle portion are generally co-planar with one another. The tool further includes a notch extending inward into the head portion of the main body and an accessory disposed at the second end.

In a feature of this aspect, the food skewer further includes a grip covering at least part of the handle portion of the main body.

In another feature of this aspect, the notch narrows to a width of approximately ¼ inch. In another feature of this aspect, a mouth of the notch has a width of approximately ½ inch.

In another feature of this aspect, the accessory is a bottle opener.

In another feature of this aspect, the notch includes a hook-shaped notch at its innermost point. In a further feature, the hook-shaped notch extends at a right angle from the remainder of the notch.

Broadly defined, the present invention according to another aspect is a food skewer tool for removal of a food article from a skewer. The tool includes a main body that includes a head portion disposed at a first end and a handle portion disposed at a second end. The head portion and handle portion are generally co-planar with one another. The tool further includes a notch extending inward into the head portion of the main body. The notch includes a hook-shaped portion at its innermost point.

In a feature of this aspect, the food skewer tool further includes a grip covering at least part of the handle portion of the main body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIGS. 1A and 1B are a side view and a front view, respectively, of a food skewer tool in accordance with one or more preferred embodiments of the present invention;

FIGS. 2A and 2B are a side view and a front view, respectively, of a food skewer tool in accordance with an alternative preferred embodiment of the present invention;

DETAILED DESCRIPTION

Figure 3:
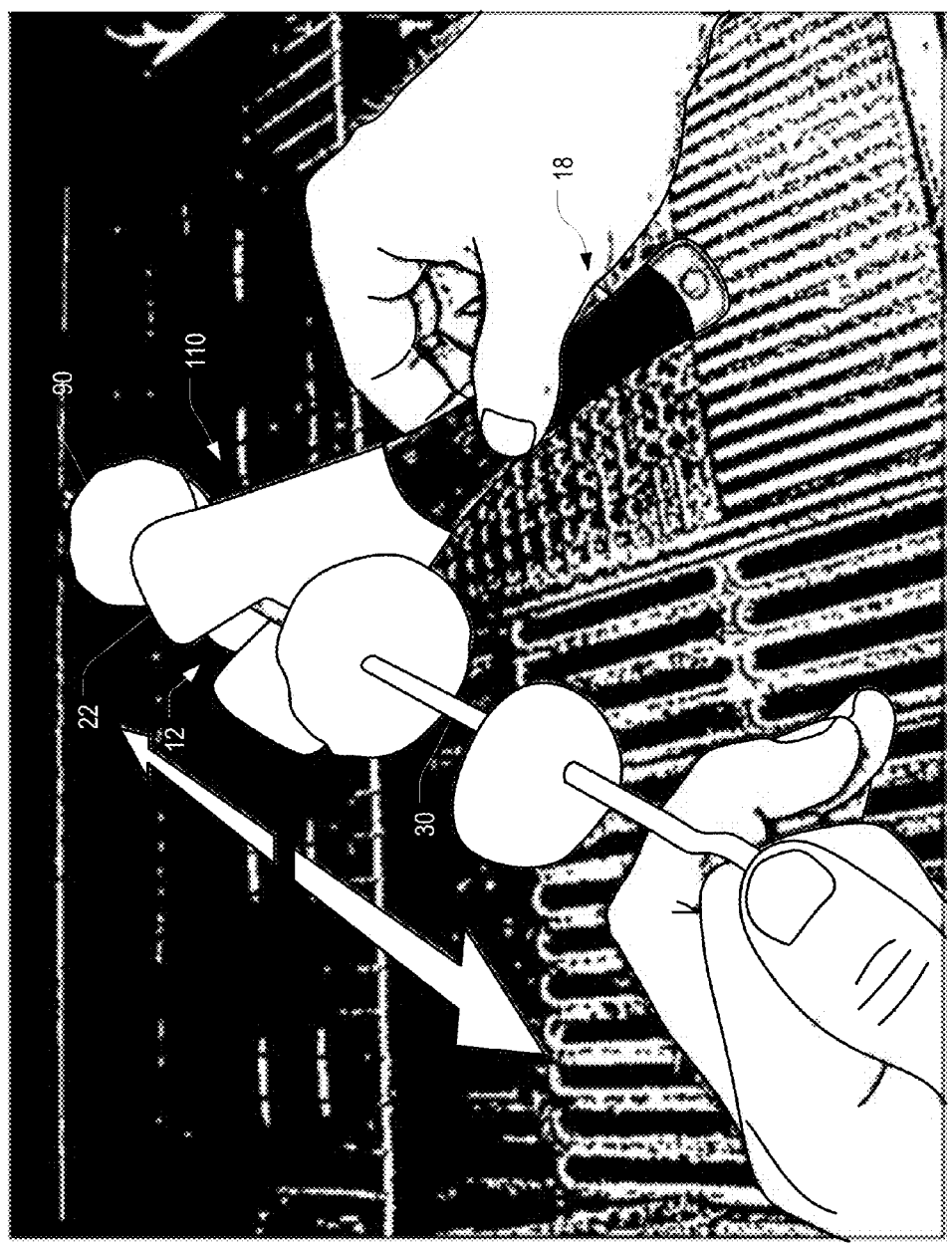
FIG. 3 is a perspective view of the food skewer tool of FIGS. 2A and 2B, shown in use.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

FIGS. 1A and 1B are a side view and a front view, respectively, of a food skewer tool 10 in accordance with one or more preferred embodiments of the present invention. As shown therein, the food skewer tool 10 is a tool for loading or removing food from a cooking skewer and includes an elongated main body 20 and a notch 12 in an end thereof. The main body 20 includes a head portion 22 and a distinct handle portion 24. To simplify manufacturing, the handle portion 24 and the head portion 22 are preferably formed from a single flat piece of stainless steel or other suitable material, and are co-planar with each other. The notch 12 is located in the head portion 22 and extends inward from the periphery thereof. The notch 12 is sized and shaped to accommodate a variety of different types of food skewers, which may have differing cross-sectional shapes. In a contemplated embodiment, the notch 12 is suited to accommodate food skewers having a generally circular cross-sectional shape. At its innermost point, the notch 12 is preferably between ⅛ inch and ½ inch wide. In at least some embodiments, the notch 12 widens to a mouth which is preferably between ¼ inch and ¾ inch wide. In one contemplated commercial embodiment, the notch 12 is generally circular at its innermost point and has a width there of about ¼ inch, and the notch 12 has a mouth, with curved corners, which is about ½ inch wide. The head portion 22 itself is preferably between 1 inch and 5 inches wide, and the overall length of the tool (including the handle portion 24) is preferably between 2 and 10 inches long. In one contemplated commercial embodiment, the head portion 22 is about 3 inches wide, and the overall length of the tool 10 is about 7 inches.

In at least some embodiments, an aperture 14 may penetrate the main body 20 to provide a way to hang the tool 10 from a hook (not shown) when not in use, or to attach it to another object. In at least some embodiments, such an aperture 14 is located in an end of the handle portion 24 opposite the head portion 22.

FIGS. 2A and 2B are a side view and a front view, respectively, of a food skewer tool 110 in accordance with an alternative preferred embodiment of the present invention. As shown therein, the food skewer tool 110 includes an elongated main body 20, a notch 12 in an end thereof, and a grip 16 at an opposite end thereof. As with the tool 10 of FIGS. 1A and 1B, the main body 20 includes a head portion 22 and a distinct handle portion 24. To simplify manufacturing, the handle portion 24 and the head portion 22 are preferably formed from a single flat piece of stainless steel or other suitable material, and are co-planar with each other. The notch 12 is located in the head portion 22 and may have characteristics similar to those described previously. The grip 16 is a cover or partial cover of material, preferably having heat insulation characteristics, that is preferably attached permanently or semi-permanently to the handle portion 24 of the main body 20. Materials suitable for use as the grip 16 in at least some embodiments of the present invention include silicones, elastomers, and the like. The grip 16 and the handle portion 24 of the main body 20 together form a handle 18.

FIG. 3 is a perspective view of the food skewer tool 110 of FIGS. 2A and 2B, shown in use. As depicted therein, a user grips the handle 18 in one hand and a skewer 30 in the other. Individual food pieces 90 may be loaded onto the skewer 30 by positioning the notch 12 around the skewer 30, against a particular food piece 90, and using the head portion 22 of the tool 110 to force the food piece 90 along the skewer 30. Similarly, cooked food pieces 90 may be removed from the skewer 30 by reversing the direction in which the food piece 90 is pushed. These movements are represented by the large arrows in FIG. 3. A food piece 90 may be loaded onto the skewer 30 by pulling it toward the user, or may be removed by pushing it away from the user. Of course, if preferred, a user may choose to hold the skewer 30 and tool 110 in different positions/orientations, but the basic operation remains the same.

Figure 4:
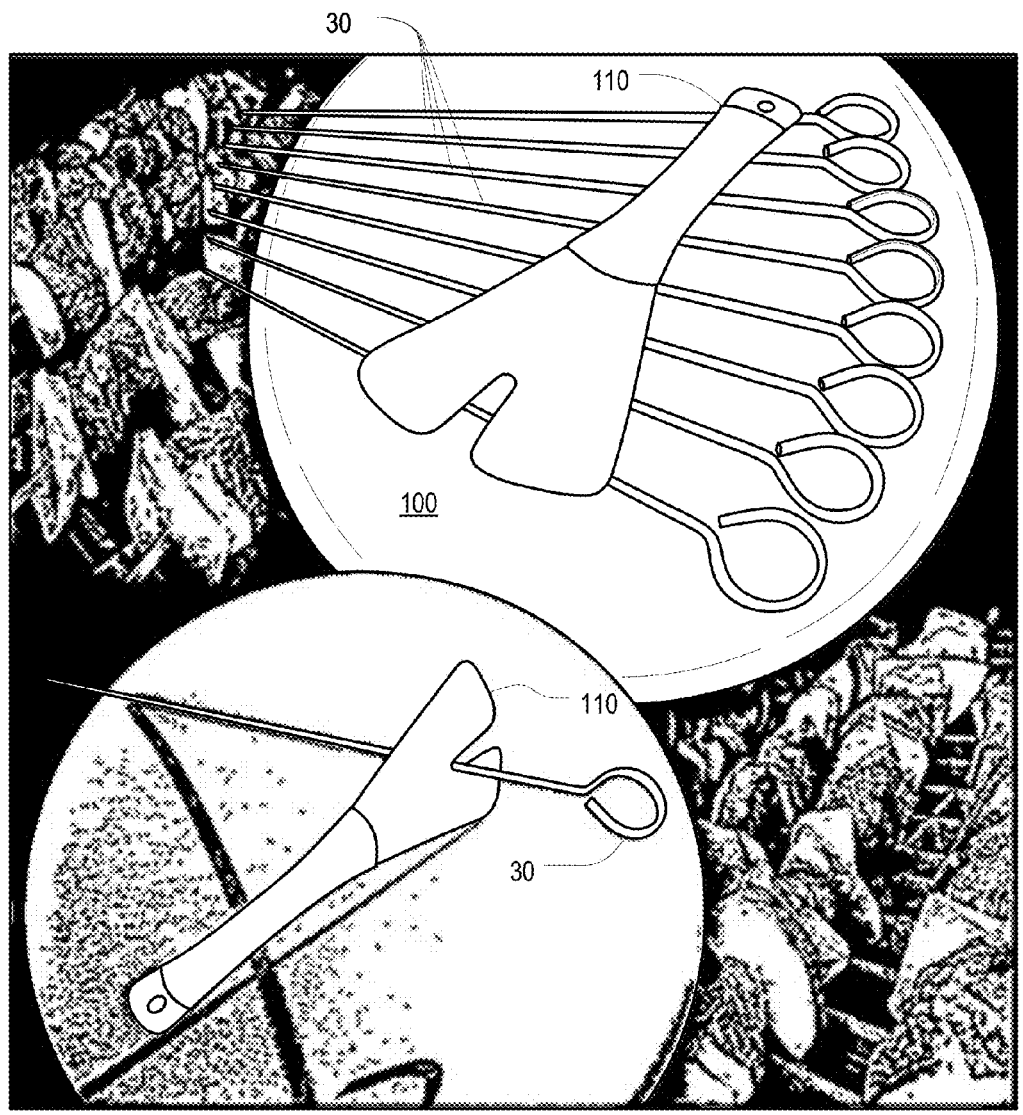
FIG. 4 is a perspective view of a food skewer set in accordance with one or more preferred embodiments of the present invention.

FIG. 4 is a perspective view of a food skewer set 100 in accordance with one or more preferred embodiments of the present invention. As shown therein, the food skewer set 100 includes a plurality of skewers 30 and one or more food skewer tools 110. It is contemplated that various food skewer sets may include greater or fewer numbers of skewers 30, and may include a larger number of food skewer tools 110. For example, a set may include four, six, or eight food skewer tools 110 so that each of a plurality of guests may have their own skewer tool 110 in order to be able to remove their food from their skewer or skewers 30.

Figure 5:
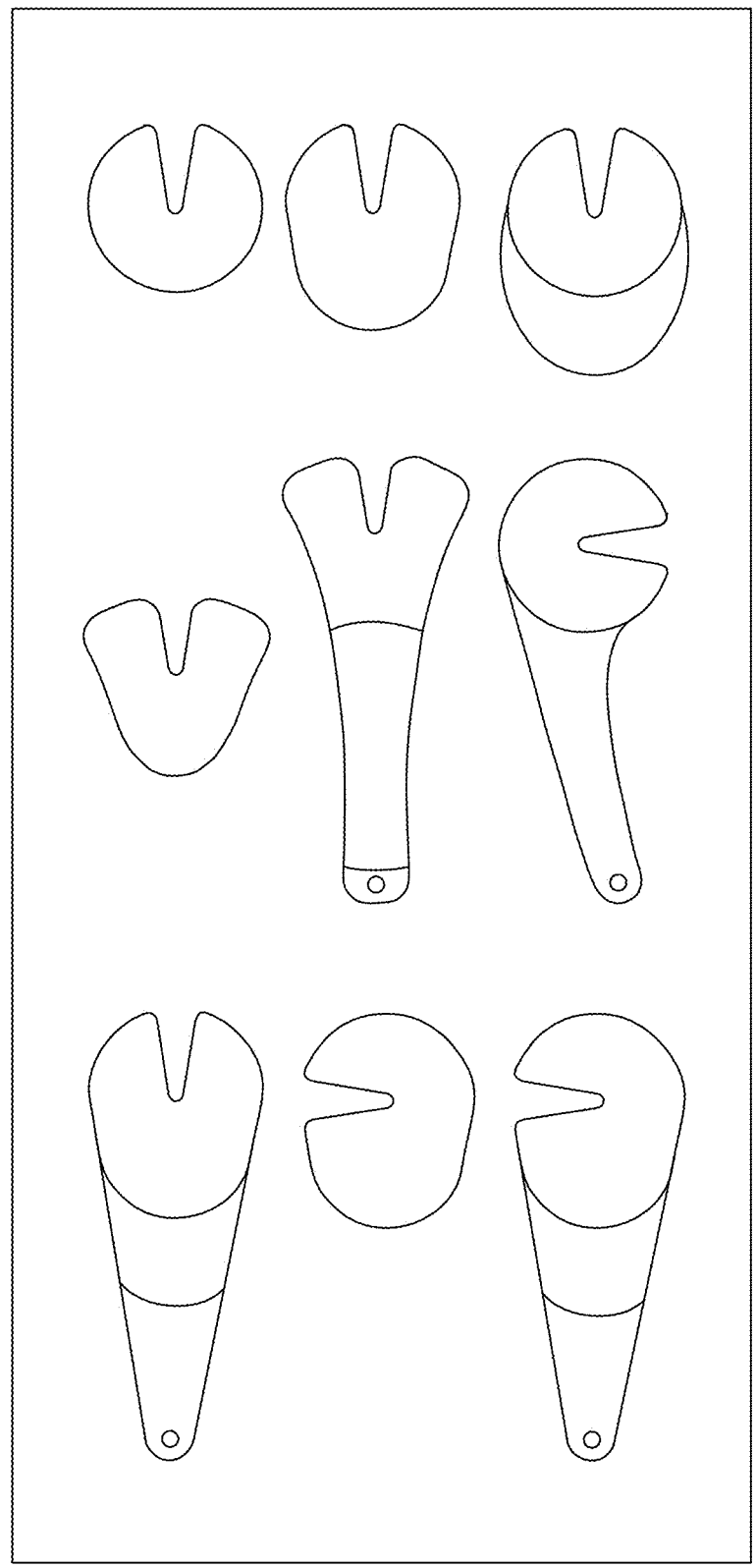
FIG. 5 is a front view of various alternative food skewer tools.

FIG. 5 is a front view of various alternative food skewer tools. As illustrated therein, a head portion may have different shapes; a notch may be located in different positions and orientations; a handle portion may be elongated or may be minimized, its shape may be changed, or it may be offset relative to the head portion; a grip may be provided in varying locations; and the like.

Figures 6A, 6B:
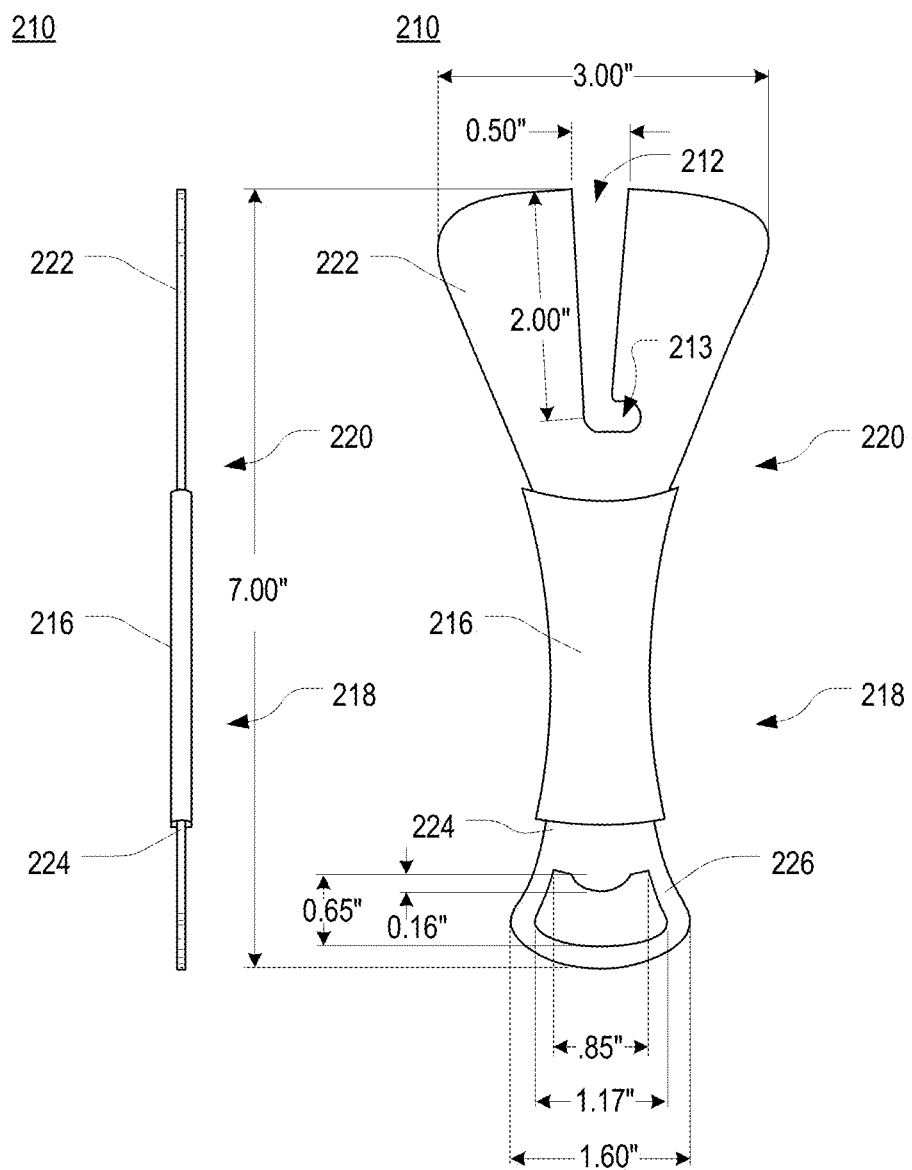
FIGS. 6A and 6B are a side view and a front view, respectively, of a food skewer tool in accordance with another alternative preferred embodiment of the present invention.

FIGS. 6A and 6B are a side view and a front view, respectively, of a food skewer tool 210 in accordance with another alternative preferred embodiment of the present invention. As shown therein, the food skewer tool 210 includes an elongated main body 220, a notch 212 in an end thereof, and a grip 216 at an opposite end thereof. The main body 220 includes a head portion 222, a distinct handle portion 224, and an accessory 226. To simplify manufacturing, the handle portion 224 and the head portion 222, and in at least some embodiments the accessory 226, are preferably formed from a single flat piece of stainless steel or other suitable material. Also in at least some embodiments, the handle portion 224, the head portion 222, and the accessory 226 are also co-planar with each other, while in other embodiments the handle portion 224 and the head portion 222 are co-planar with each other, while the accessory 226 is curved or crimped relative to the other portions.

The notch 212 is sized and shaped to accommodate a variety of different types of food skewers, which may have differing cross-sectional shapes. In a contemplated embodiment, the notch 212 is suited to accommodate food skewers having a generally circular cross-sectional shape. The notch 212 is located in the head portion 222 and extends inward from the periphery thereof and includes a hook-shaped notch 213 at its innermost point, where it is preferably between ⅛ inch and ½ inch wide. The hook-shaped notch 213 may extend at a right angle relative to the rest of the notch 212, or it may extend at some other angle. In at least some embodiments, the notch 212 widens to a mouth which is preferably between ¼ inch and ¾ inch wide. In one contemplated commercial embodiment, the notch 212 is approximately 2 inches deep, the notch is generally circular at its innermost point and has a width there of about 0.28 inches, and the notch 212 has a mouth, with curved corners, which is about ½ inch wide. The head portion 222 itself is preferably between 1 inch and 5 inches wide, and the overall length of the tool (including the handle portion 224) is preferably between 2 and 10 inches long. In one contemplated commercial embodiment, the head portion 22 is about 3 inches wide, and the overall length of the tool 210 is about 7 inches. Other contemplated dimensions are shown in FIG. 6B.

The grip 216 is a cover or partial cover of material, preferably having heat insulation characteristics, that is preferably attached permanently or semi-permanently to the handle portion 224 of the main body 220. Materials suitable for use as the grip 216 in at least some embodiments of the present invention include silicones, elastomers, and the like. The grip 216 and the handle portion 224 of the main body 220 together form a handle 218.

The accessory 226 may include any accessory that might be useful during grilling, casual dining, or the like. For example, the accessory 226 might be a bottle opener, as shown in FIG. 6B.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof

What is claimed is:

1. A food skewer tool for removal of a food article from a skewer, the tool comprising:
    a main body that includes a head portion disposed at a first end and a handle portion disposed at a second end, the head portion and handle portion being generally co-planar with one another;
    a notch extending inward into the head portion of the main body, wherein a hook-shaped portion extends at an angle from a narrow area of the notch; and
    an accessory disposed at the second end.

2. The food skewer tool of claim 1, further comprising a grip covering at least part of the handle portion of the main body.

3. The food skewer tool of claim 1, wherein the notch narrows to a width of approximately ¼ inch.

4. The food skewer tool of claim 1, wherein a mouth of the notch has a width of approximately ½ inch.

5. The food skewer tool of claim 1, wherein the accessory is a bottle opener.

6. The food skewer tool of claim 1, wherein the hook-shaped portion extends at a right angle from the narrow area of the notch.

* * * * *